Dec. 16, 1958     K. ASHAUER ET AL     2,864,476
SYNCHRONIZER
Filed March 6, 1956
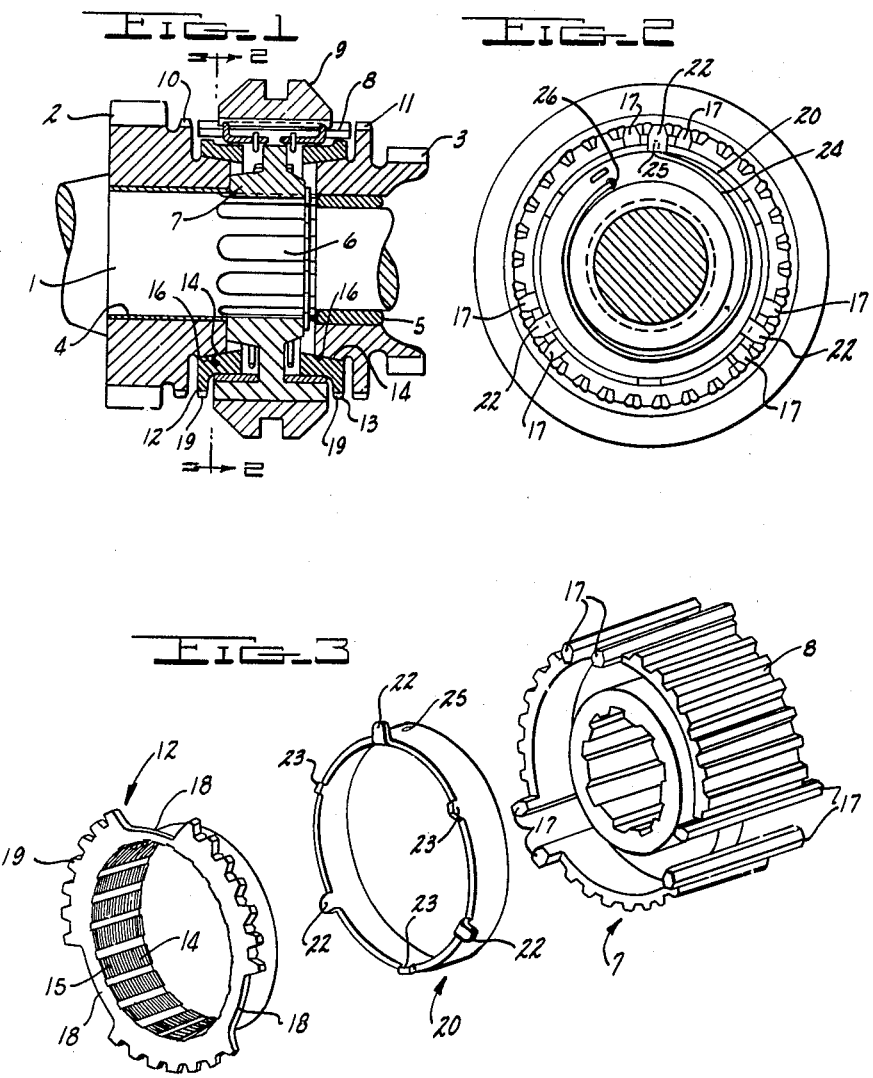
INVENTOR.
KARL ASHAUER
MANFRED KALVERSBERG
BY HEINZ DORPMUND
SMITH, OLSEN & KOTTS
ATTORNEYS United States Patent Office 2,864,476
Patented Dec. 16, 1958

2,864,476

SYNCHRONIZER

Karl Ashauer, Manfred Kalversberg, and Heinz Dorpmund, Wolfsburg, Germany, assignors to Volkswagenwerk, G. m. b. H., Wolfsburg, Germany, a corporation of Germany Application March 6, 1956, Serial No. 569,749

9 Claims. (Cl. 192—53)

The present invention relates to a synchronizer for automobile transmissions which is adapted to effect synchronization of a pair of torque-transmitting members preparatory to connecting said members in positive drive engagement with each other.

It is well known to achieve synchronization by using friction rings which are moved by means of a gearshift sleeve and which bring about synchronization through initial frictional engagement of one of such rings with an associated torque-transmitting member. The known synchronizers of this type are comparatively multipartite because of the thrust or pressure plates on the circumference of the clutch teeth which provide a detachable connection between the gearshift sleeve and the synchronizing ring. In addition, associated with each pressure or thrust plate are spring elements which increase still further the total number of parts.

It is among the objects of the present invention to overcome this shortcoming of the prior art by providing a transmission synchronizer which is characterized by its simple construction and relatively few parts while effecting optimum results when in operation. This is accomplished by providing in place of the thrust plates an intermediate toothed ring between the gearshift sleeve and the synchronizer ring, and fastening a spring or similar means so that it urges the ring a half tooth width out of phase with the teeth of the gearshift sleeve. The intermediate ring is moved circumferentially forward on the one hand by the gearshift sleeve because of locking brought about by the turning, and the intermediate ring moves relative to the synchronizing ring in a rearward direction against the biasing action of the spring because of the chamfered surfaces of the teeth of the gearshift sleeve. Thus, the latter will be allowed passage to the synchronizer ring.

In this construction the spring is ring-shaped and is fastened at its ends to the intermediate ring and to the synchronizer body for urging the intermediate ring in a circumferential direction relative to the synchronizer body. The intermediate ring has three lock teeth spaced about its circumference by which it is turned, the lock teeth having a limited amount of play in associated recesses in the synchronizer body. Three protrusions in the synchronizer body serve to rotate the synchronizer ring with a limited amount of play. Thus, the present invention carries out the object of providing the necessary blocking action and to effect synchronization with a minimum number of parts.

It is accordingly another object of the present invention to provide a synchronizer of the foregoing character wherein the conventional pressure or thrust plates heretofore used can be dispensed with and a simple ring formed from a sheet metal stamping can be used in place thereof thereby reducing material and assembly costs.

Other objects of this invention will appear in the following description and appended claims, reference being had to the accompanying drawings forming a part of this specification wherein like reference characters designate corresponding parts in the several views.

In the drawings:

Figure 1 is a sectional view of the transmission synchronizer mounted between two torque transmitting members;

Figure 2 is a section taken on the lines 2—2 of Figure 1; and

Figure 3 is an exploded view in perspective of the synchronizer body, the intermediate ring and the synchronizer ring.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. Reference number 1 denotes the driving shaft on which the gears 2 and 3 are rotatably mounted by means of the bushings 4 and 5. Drive shaft 1 is splined as at 6. Mounted on the splined portion 6 against relative rotation is a hub or synchronizer body 7 which has its outer periphery splined as at 8. An internally splined jaw clutch or gearshift sleeve 9 is slidably mounted over the splined portion 8 of the synchronizer body 7 for the purpose of establishing a positive clutch engagement between the synchronizer body 7 and either the gear teeth 10 of gear 2 or gear teeth 11 of gear 3.

To establish synchronization of rotation between the gears 2 or 3 and the jaw clutch or gearshift sleeve 9, synchronizer rings 12 and 13 are of a conventional type having friction surfaces 14 with grooves 15 therein. Each synchronizer ring is movable by the sleeve 9 to complementary friction surfaces 16 on the gears 2 and 3. This effects frictional engagement between the complementary surfaces tending to produce the same rotational speed between the gears 2 or 3 and the synchronizer body 7, because the synchronizer rings 12 are coupled in rotation with the synchronizer body 7 by means of the lateral protrusions 17 which form a part of body 7.

Synchronizer rings 12 and 13 have gaps 18 formed in the toothed flanges 19 into which the protrusions 17 extend. The teeth 19 of the synchronizer rings 12 and 13 mesh with the internal teeth or splines in the sleeve 9. The teeth of the synchronizer rings 12 and 13 are chamfered on the sides facing the sleeve 9 to correspond to the chamfered faces of the internal teeth or splines of said sleeve 9.

Located between the synchronizer rings 12, 13 and the synchronizer body 7 are intermediate rings 20, 21 having three teeth 22 circumferentially spaced so as to correspond in shape and spacing to the teeth 19 of the synchronizer rings 12, 13. The teeth 22 are also chamfered in the side facing the synchronizer body 8 and are situated in the gaps between the protrusions 17 with a play of half a tooth width in the direction of rotation.

The intermediate ring 20 also has protrusions 23 with which it pushes against the associated synchronizer ring thus moving such rings onto the friction surface 16 of gear 2 or 3.

A spring 24 is mounted so that it urges the intermediate ring 20 constantly against one of the protruding members 17. To accomplish this result, one end of spring 24 extends into the hole 25 in the intermediate ring 20 and the other end extends into a hole 26 in the synchronizing body 7. The spring 24 then tends to straighten out thereby urging the teeth 22 against the protruding members 17 on one side of the gap formed between each pair of such members.

Figure 1 shows the gearshift sleeve 9 disengaged and in the neutral position. If the sleeve 9 is moved to one side or the other to engage gear 2 or 3, its teeth first meet the obstructing teeth 22 of the intermediate ring 20, thus moving said ring 20 against the synchronizer ring 12 or 13 and said synchronizer ring on against the friction surface 16 of gear 2 or 3. This has the effect of providing a frictional drive between the gear 2 or 3 and the synchronizer body 7, because synchronizer ring 12 is now locked against the protrusioning members 17. Further sliding of the sleeve 9 then has the effect of turning the intermediate ring 20 against the tension of spring 24 by the camming action of the associated chamfered teeth in sleeve 9 and the intermediate ring 20. This has the effect of creating a passageway for the splines of sleeve 9 to advance toward the teeth 19 in the synchronizer ring 12. When the synchronization of speed exists between the synchronizer ring and its associated gear, the synchronizer ring is turned a half tooth width by the camming action of associated chamfered teeth on the synchronizer ring and the sleeve 9, thus permitting the sleeve 9 to pass through the teeth 19 and into engagement with the gear teeth in the gears 2 or 3.

From the foregoing it can be understood that the described transmission synchronizer has considerably fewer parts than the prior art units that perform the same synchronizing functions. This serves to reduce the cost of the described synchronizer and results in less opportunity for failure in operation.

Having thus described our invention, we claim:

1. In a synchronizing transmission having a jaw clutch sleeve with internal teeth, a synchronizer body on which said sleeve is mounted for axial movement, and a synchronizer ring adapted to frictionally engage a clutching surface on an associated gear; an intermediate ring operatively positioned between said sleeve and said synchronizer ring and having a plurality of teeth in axial alignment with internal teeth of said sleeve, spring means operatively connected between said intermediate ring and said synchronizer body for urging said intermediate ring circumferentially one half tooth-width out of phase with the corresponding teeth of said sleeve, said intermediate ring being axially movable by said sleeve for pressing the synchronizer ring against its associated gear, said intermediate ring and said sleeve having associated cam surfaces which contact when said intermediate ring is moved by said sleeve and bias said intermediate ring circumferentially against said spring means so that the teeth of the sleeve can pass through the intermediate ring teeth to the synchronizer ring.

2. The combination of claim 1 wherein rotation of said synchronizer ring and said intermediate ring is limited by lateral protrusion on said synchronizer body.

3. The combination of claim 2 wherein pairs of protrusions in the synchronizer body extend into gaps formed between teeth in the synchronizer ring and teeth of the intermediate ring extend into the gap formed by each pair of protrusions.

4. The combination of claim 1 wherein said spring means comprises a spring ring having its one end attached to the intermediate ring and its other end attached to the synchronizer body.

5. In a synchronizing transmission, a pair of torque-transmitting members mounted in axial alignment, a movable jaw clutch element carried by one of said members and adapted to be moved axially into engagement with a jaw clutch element carried by the other member so as to establish a positive drive connection between said members, a synchronizer element having an axially shiftable connection with said one member and adapted to be moved into frictional driving engagement with a friction clutch element carried by said other member so as to effect synchronization of said members, a thrust member between the movable jaw clutch element and the synchronizer element having a lost motion circumferentially oscillatable and axially shiftable connection with said movable jaw clutch element, blocker means carried by said thrust member, spring means urging said thrust member to one of its lost motion positions wherein the blocker means is in the axial path of movement of said movable jaw clutch element until sufficient thrust has been exerted against said thrust member to cause it to oscillate to a different circumferential position in which a passageway in said thrust member will allow the movable jaw clutch element to advance axially to the synchronizer element.

6. In a synchronizing transmission, a pair of torque-transmitting members mounted in axial alignment, a movable jaw clutch element carried by one of said members and adapted to be moved axially into engagement with a jaw clutch element carried by the other member so as to establish a positive drive connection between said members, a synchronizer ring axially shiftable on said one member and adapted to move into frictional driving connection with said other member so as to effect synchronization of said members, an intermediate ring between the movable clutch element and the synchronizer ring having a lost motion circumferentially oscillatable and axially shiftable connection with said movable jaw clutch element, a plurality of teeth extending from the periphery of said intermediate ring into the path of axial movement of said sleeve when the intermediate ring is in one position of oscillatable movement, spring means urging said intermediate ring to said one position; and associated means on said sleeve and said intermediate ring for oscillating said intermediate ring to another position upon application of thrust thereby allowing said sleeve to move past said intermediate ring to said synchronizer ring.

7. In a synchronizing transmission, a hub, a movable jaw clutch sleeve encircling said hub, drivingly connected thereto, and axially shiftable thereon for positive clutching engagement with a torque-transmitting member so as to provide a positive drive between said hub and said torque-transmitting member, a synchronizer ring having a lost motion driving connection with said hub and including blocking means adapted in one of the lost motion positions to block the path of axial shifting movement of said movable jaw clutch sleeve and in another of such positions to allow the movable jaw clutch sleeve to complete its axial shifting movement whereby to prevent said movable clutch element from moving into positive engagement with a torque-transmitting member until synchronization is substantially complete, an intermediate ring disposed between said hub and said synchronizer ring and having blocker means extending in the path of axial movement of said clutch sleeve, said intermediate ring having a lost motion circumferentially oscillatable and axially shiftable connection with said clutch sleeve and said hub, spring means urging said intermediate ring into its blocking position, said blocking means cooperating with said sleeve when axial thrust is applied to the latter to move said intermediate ring into an unblocking position.

8. A synchronizing transmission as claimed in claim 7 wherein the extent of oscillation of said synchronizer and intermediate rings is limited by protrusions on said hub.

9. A synchronizer transmission as claimed in claim 7 wherein said hub has pairs of protrusions, the blocker means of said intermediate ring extending between each pair of protrusions and the blocker means of said synchronizer ring fitting on opposite sides of such pairs of protrusions for limiting the oscillating movements of each ring.

References Cited in the file of this patent

UNITED STATES PATENTS

| | | |
|---|---|---|
| 2,200,851 | Osborne | May 14, 1940 |
| 2,201,149 | Best | May 21, 1940 |
| 2,377,206 | Butzbach | May 29, 1945 |
| 2,619,210 | Voigt | Nov. 25, 1952 |

FOREIGN PATENTS

| | | |
|---|---|---|
| 1,099,090 | France | Mar. 16, 1944 |